United States Patent
Peylo et al.

(10) Patent No.: US 10,893,069 B2
(45) Date of Patent: Jan. 12, 2021

(54) DIAMETER EDGE AGENT ATTACK DETECTION

(71) Applicant: Nokia Technologies Oy, Espoo (FI)

(72) Inventors: Martin K. Peylo, Espoo (FI); Silke Holtmanns, Klaukkala (FI)

(73) Assignee: Nokia Technologies Oy, Espoo (FI)

( * ) Notice: Subject to any disclaimer, the term of this patent is extended or adjusted under 35 U.S.C. 154(b) by 347 days.

(21) Appl. No.: 15/441,363

(22) Filed: Feb. 24, 2017

(65) Prior Publication Data

US 2017/0295201 A1 Oct. 12, 2017

Related U.S. Application Data

(60) Provisional application No. 62/318,819, filed on Apr. 6, 2016.

(51) Int. Cl.
*H04L 29/06* (2006.01)
*H04W 12/12* (2009.01)

(52) U.S. Cl.
CPC ...... *H04L 63/1466* (2013.01); *H04L 63/1458* (2013.01); *H04W 12/1205* (2019.01); *H04W 12/1206* (2019.01)

(58) Field of Classification Search
CPC combination set(s) only.
See application file for complete search history.

(56) References Cited

U.S. PATENT DOCUMENTS

| 5,892,903 | A | * | 4/1999 | Klaus | G06F 21/577 |
| | | | | | 709/227 |
| 5,958,053 | A | * | 9/1999 | Denker | H04L 67/42 |
| | | | | | 709/227 |
| 7,360,245 | B1 | | 4/2008 | Ramachandran et al. | |

(Continued)

FOREIGN PATENT DOCUMENTS

| WO | WO-2006/004556 A1 | 1/2006 |
| WO | WO-2007/019583 A2 | 2/2007 |

OTHER PUBLICATIONS

Shelby, Z., et al., RFC 7252, "The Constrained Application Protocol (CoAP)", IETF, Jun. 2014, 112 pgs.

(Continued)

*Primary Examiner* — Lynn D Feild
*Assistant Examiner* — Richard A McCoy
(74) *Attorney, Agent, or Firm* — Harrington & Smith (57) ABSTRACT

In accordance with the example embodiments of the Invention there is at least a method and apparatus to detect that at least one message received from another network device of a communication network is in response to a prior message using a spoofed source address; based on the detecting, mirror the at least one message; and send to the another network device the mirrored at least one message to cause the another network device to filter out the at least one message in response to the prior message using the spoofed address. Further, there is at least a method and apparatus to receive from a network node signaling associated with at least one message; based on the signaling, detect that the at least one message is in response to a prior message using a spoofed source address; and based on the detecting, filter out the at least one message in response to the prior message using the spoofed source address.

15 Claims, 4 Drawing Sheets

(56) References Cited

U.S. PATENT DOCUMENTS

| | | | |
|---|---|---|---|
| 2002/0166071 A1* | 11/2002 | Lingafelt | H04L 63/1408 726/14 |
| 2003/0110274 A1* | 6/2003 | Pazi | H04L 63/08 709/229 |
| 2005/0259645 A1 | 11/2005 | Chen et al. | |
| 2007/0097963 A1* | 5/2007 | Thermos | H04L 63/1433 370/352 |
| 2007/0121596 A1* | 5/2007 | Kurapati | H04L 29/06027 370/356 |
| 2007/0266426 A1* | 11/2007 | Iyengar | H04L 9/3213 726/5 |
| 2008/0028467 A1 | 1/2008 | Kommareddy et al. | 726/23 |
| 2011/0091026 A1* | 4/2011 | van Oortmarssen | H04M 3/38 379/142.01 |
| 2013/0322448 A1* | 12/2013 | Vihtari | H04L 45/74 370/392 |

OTHER PUBLICATIONS

Ferguson, P., et al., RFC 2827, "Network Ingress Filtering: Defeating Denial of Service Attacks which employ IP Source Address Spoofing", IETF, May 2000, 10 pgs.

* cited by examiner

DIAMETER EDGE AGENT ATTACK DETECTION

CROSS-REFERENCE TO RELATED APPLICATION

This patent application claims priority under 35 U.S.C. § 119(e) from U.S. Provisional Patent Application No.: 62/318,819, filed on Apr. 6, 2016, the disclosure of which is incorporated by reference herein in its entirety.

TECHNICAL FIELD

The teachings in accordance with the example embodiments of this invention relate generally to deflecting attacks coming over the Interconnection between operator networks and, more specifically, relate to deflecting attacks coming over the Interconnection between operator networks such as GRX/IPX or SS7 based networks.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description, and claims in this application and is not admitted to be prior art by inclusion in this section.

Certain abbreviations that may be found in the description and/or in the Figures are herewith defined as follows:
3GPP $3^{rd}$ Generation Partnership Project
ACK Acknowledgement
AVP Attribute Value Pair
BGP Border Gateway Protocol
DEA Diameter Edge Agent
DRA Diameter Routing Agent
DPA Diameter Proxy Agent
DoS Denial of Service Attack
GPRS general packet radio service
GRX GPRS Roaming Exchange
GSM Global System for Mobile Communication
GSMA GSM Association
GT Global Title
HLR Home Location Register
HSS Home Subscriber Server
IP Internet protocol
IMSI International Mobile Subscriber Identity
IPX Interconnectivity Provider Exchange
ISD Insert Subscriber Data Message
IDR Insert Subscriber Data Request
MAP Mobile Application Part
MME Mobility Management Entity
MSC Mobile Switching Centre
RIFS Roaming and Interconnect Fraud and Security
PCRF Policy and Charging Rules Function
PRN Provide Roaming Number
SS7 signaling system 7
STP Signal Transfer Point
TCAP Transaction Capabilities Application Part
UL uplink
VLR Visitor Location Register Typical attacks are those that modify user profile for fraud or those are causing a Denial of Service against a network node or a user. Those attacks have been observed in the wild e.g. by well-known tier 1 network operators diameter purge/reset command usage/faulty load balancing messages etc.

Due to the large amount of attacks (e.g. for one command a large Asian tier 1 operator got more than 9 million attacks in 3 month). Operators evaluate legal and technical approaches to identify and punish misbehaving interconnection partners. Those misbehaving partners cause large scale load (and potential outage of no des), loss and leak of subscriber data (e.g. cryptographic keys, location), fraud and service unavailability for users. There is the major stumbling block in those discussion is that the attack message might misuse the identity of a well behaving partner and that partner is blamed (and wrongly punished).

There is a need a solution for this problem at least for the reason that if this problem is not solved then there can be no interconnection without at least operator liabilities. One can not introduce any punishments or liabilities, if one cannot be reasonable sure, to punish accidentally the wrong party. On the other hand, if there are no consequences to misusing the interconnection, then why should attackers or misbehaving operators stop their activities.

SUMMARY

In an example aspect of the invention, there is a method comprising: detecting, by a network node, that at least one message received from another network device of a communication network is in response to a prior message using a spoofed source address; based on the detecting, mirroring the at least one message; and sending to the another network device the mirrored at least one message to cause the another network device to filter out the at least one message in response to the prior message using the spoofed address.

In an example aspect of the invention, there is an apparatus comprising: at least one processor; and at least one memory including computer program code, where the at least one memory and the computer program code are configured, with the at least one processor, to cause the apparatus to at least: detect that at least one message received from another network device of a communication network is in response to a prior message using a spoofed source address; based on the detecting, mirror the at least one message; and send to the another network device the mirrored at least one message to cause the another network device to filter out the at least one message in response to the prior message using the spoofed address.

In another example aspect of the invention, there is a method comprising: receiving, by a network device of a communication network, from a network node signaling associated with at least one message; based on the signaling, detecting that the at least one message is in response to a prior message using a spoofed source address; and based on the detecting, filtering out the at least one message in response to the prior message using the spoofed source address.

In still another example aspect of the invention, there an apparatus comprising at least one processor; and at least one memory including computer program code, where the at least one memory and the computer program code are configured, with the at least one processor, to cause the apparatus to at least: receive from a network node signaling associated with at least one message; based on the signaling, detect that the at least one message is in response to a prior message using a spoofed source address; and based on the detecting, filter out the at least one message in response to the prior message using the spoofed source address.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

In this invention, we propose at least a method and apparatus to deflect attacks coming over the Interconnection between operator networks.

The example embodiments of the invention work to deflect attacks coming over the Interconnection between operator networks i.e. GRX/IPX or SS7. The example embodiments described are focused on LTE and 5G interconnect scenarios, but this is none limiting to those and also apply to 4G, 3G and 2G. The same security solution in accordance with the example embodiments could also be applied to legacy approaches like SS7 and is compatible with such.

The example embodiments of the invention work to deflect attacks coming over an interconnection between operator networks, such as when:

The Attacker uses the identity of a partner operator and performs an attack that does not require an answer to be routed correctly (e.g. interconnect fraud that modifies a subscriber accounts, DoS attacks);

The attacked operator complains then to his partner operator, but that partner operator is not aware of anything, since he has not send any message;

The partner operator may then only find some strange "ack" messages, where he did not send the requests. This kind of messages are usually considered configuration error by some other network and discarded silently.

The example embodiments of the invention provide a mechanism and protocol usage, how the partner operator can automatically inform the attacked operator, that an attack is ongoing and thereby by raising awareness indicating that he is not the REAL source of the attack messages. The operations in accordance with the example embodiments also describe how to filter and process messages so as to allow fast attack detection and mitigation of financial damage or preventing a DoS against the user and also DoS against network nodes. In addition, we describe how the mechanism work, when you have intermediate parties (interconnectivity providers) are part of the transport path.

Figure 1:
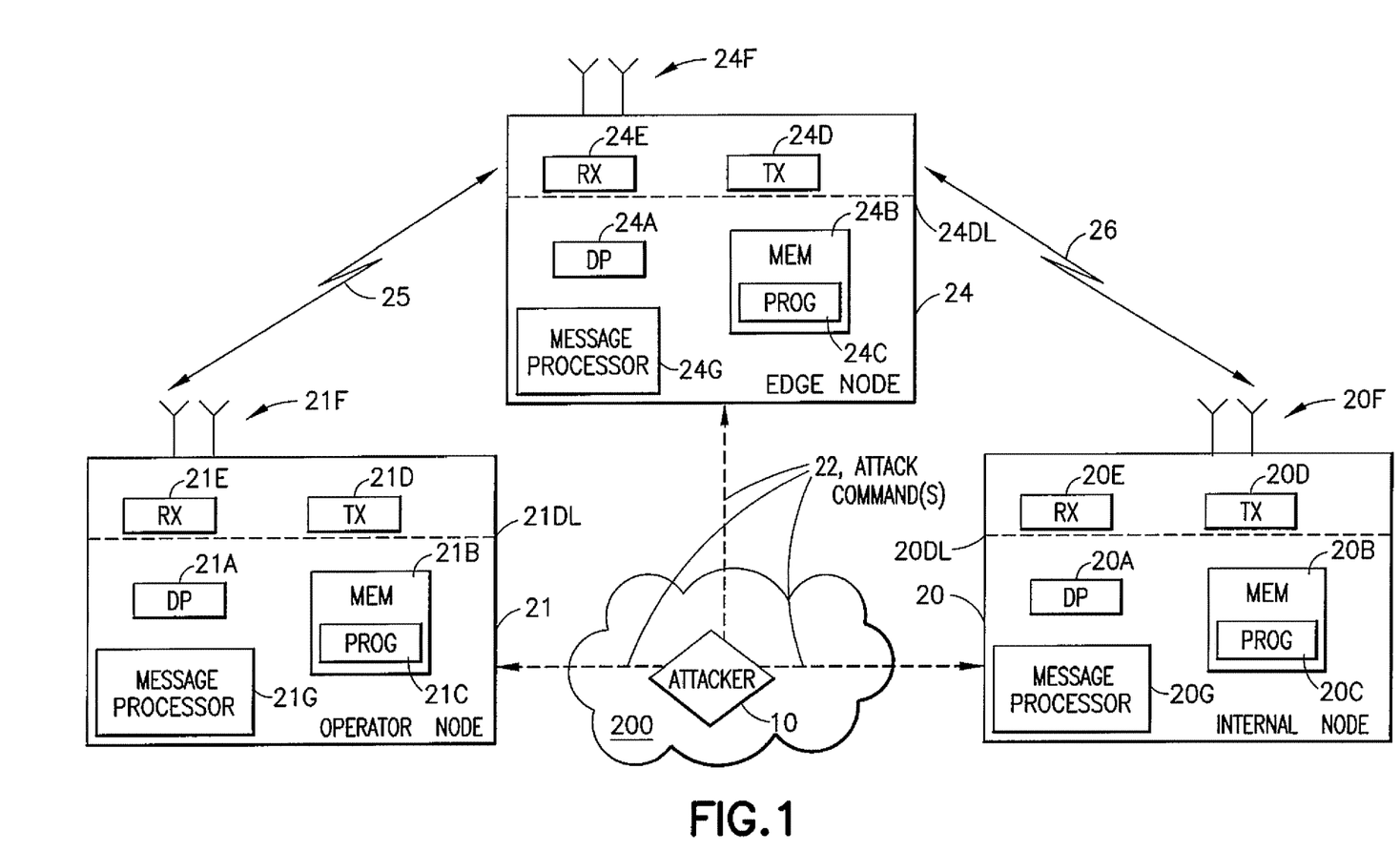
FIG. 1 shows a simplified block diagram of devices which may be configured to perform operations in accordance with some embodiments of the invention.

Before describing the exemplary embodiments of the invention in further detail reference is now made to FIG. 1. As illustrated in FIG. 1, the Edge Node 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E for bidirectional wireless communications with devices Internal Node 20, and/or Operator Node 21 or any other network device via its antenna 24F. The Edge Node 24 stores in its MEM 24B processing code for use by the Message Processor block 24G to perform a method enabling deflecting attacks, such as attacks coming over the Interconnection between the operator networks of Internal node 20 and the Operator Node 21. Edge nodes are typically STP, DEA, DRA or DPA. But it might also be that some core network nodes are directly connected to the interconnection network.

The Operator Node 21 similarly includes processing means such as at least one data processor (DP) 21A, storing means such as at least one computer-readable memory (MEM) 21B storing at least one computer program (PROG) 21C, and communicating means such as a transmitter TX 21D and a receiver RX 21E for bidirectional wireless communications with the Edge Node 24 and Internal Node 20 of FIG. 1 as well as the other apparatus or other network device via one or more antennas 21F. The Operator Node 21 stores in its local MEM 21B and/or its Message Processor block 21G, computer program code for signal processing. Such signal processing, for example, to perform as described herein attack detection and potential reaction operations based on data packets it receives, and to utilise such processing for detecting and stopping such carrier communications attacks.

The Internal Node 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the Edge Node 24 and the Operator Node 21, or any other communication device, via one or more antennas 20F. The RX 20E and the TX 20D are each shown as being embodied in a radio-frequency front end chip, which is one non-limiting embodiment. The Internal Node 20 also has stored in the MEM 20B at Message Processor block 20G computer program code to perform some example operations for attack detection and elimination as discussed herein.

In addition, for example purposes there is shown a cloud 200 in FIG. 1 which an Attacker 10 may use to launch attack commands 22 against network elements, such as the Internal Node 20, the Edge Node 24, and/or the Operator Node 21 as shown in FIG. 1, or their networks. It is noted that the cloud 200 can include other nodes, such as nodes of other network operators or even a same network operator as is experiencing an attack. Further, it is noted that the source of the attack may be from any location, outside or inside any network which may or may not be subject to the attack. Attacks can be launched from any node that is connected to the interconnection network. An attack can be launched via a compromised node that has access to the interconnection network. In addition, it is noted that the attack could be over communication path that are connecting networks or interconnection providers including a undersea cable connection, a wired land-line connection, or both e.g. through BGP routing attacks. It is noted that a node that the attacker may launch an attack from can be located in any type of electronic device with communication capability. Such a node can be, but is not limited to, a cellular phone, a computer (e.g., laptop, desktop computer, or server), and/or a personal data assistant to mention only a few. In addition, it is noted that the dashed arrows indicating Attack command(s) 22 can be using any type of wired and/or hardwired connection.

In accordance with some embodiments of the invention, there can be information communications over connections as indicated by arrows 25 and 26, which may be used by the Edge Node 24, Internal Node 20, and/or Operator Node 21, to perform the message processing operations in accordance with some embodiments. Further, this information can include signaling, message and communication checks as in accordance with the example embodiments of the invention. It is noted that arrows 25 and 26 are non-limiting representations of connectivity between the Internal Node 20, the Operator Node 21, and/or the Edge Node 24. In accordance with the example embodiments these connections such as indicated by arrows 25 and 26 can include any type of hardwired, wireless, satellite, and/or electronic circuitry connections (e.g., circuitry connections internal and/or external to these devices). Further, although the Internal Node 20, Operator Node 21, and/or Edge Node 24 are shown as separate entities, any of these devices may be in the same network or be in different networks.

Further, in some embodiments of the invention, each of the steps as disclosed herein, including the interconnection attack detection and elimination, may be based on information detected and/or shared by the Internal Node 20, Operator Node 21, and/or Edge Node 24 or information received via the antenna 20F, 21F, and/or 24F as well as associated receivers RX 20E, 21E, and 24E. Such information from any one or more of the Internal Node 20, Operator Node 21, and/or the Edge Node 24 can be processed and implemented by at least one of the PROGs 20C, 21C, and/or 24C in the respective device Internal Node 20, Operator Node 21, and/or Edge Node 24. Each of the PROGs 20C, 21C, and/or 24C is assumed to include program instructions that, when executed by the associated DP 20A, 21A, and/or 24A enable the device to operate in accordance with some embodiments of this invention to perform the operations as detailed herein. Message Processor blocks 20G, 21G, and 24G may summarize different results from executing different tangibly stored software to implement certain aspects of these teachings. In these regards some embodiments of this invention may be implemented at least in part by computer software stored on the MEM 20B, 21B, and/or 24B which is respectively executable by DP 20A, 21A, and/or 24A, or by hardware, or by a combination of tangibly stored software and hardware (and tangibly stored firmware). In a typical embodiment, the countering software would be installed in the edge node. But some operators may want to install this mechanism also in core network e.g. HSS, HLR, MME directly, if they have them connected directly to the interconnection network, or if they want to detect potential security breaches inside their own network.

In addition, although the dashed lines 20DL, 21DL, and 24DL of FIG. 1 indicate that the message parts of the Internal Node 20, Operator Node 21, and/or Edge Node 24, these components and their operations may be separate from at least a processor and/or memory of the Edge Node 24, Internal Node 20, and/or Operator Node 21 of FIG. 1. Each of the RX 24E, TX 24D, and antenna 24F; the RX20E, TX20D and antenna 20F; the RX21E, TX21D and antenna 21F of the Edge Node 24, Internal Node 20, and/or Operator Node 2, respectively, are not essential to the operations in accordance with some embodiments of the invention. In accordance with non-limiting embodiments of the invention the Edge Node 24, Internal Node 20, and/or Operator Node 21 may be connected to other nodes which provide the actual user services and external radio parts for sending or receiving signaling via circuitry such as integrated circuitry.

Electronic nodes implementing some aspects of the invention need not be the entire nodes as depicted at FIG. 1, but some embodiments may be implemented by one or more components of same such as the above described tangibly stored software, hardware, firmware and data processors e.g. part of the functionality can be implemented in an edge node and part in another core network node e.g. HSS.

Figure 2:
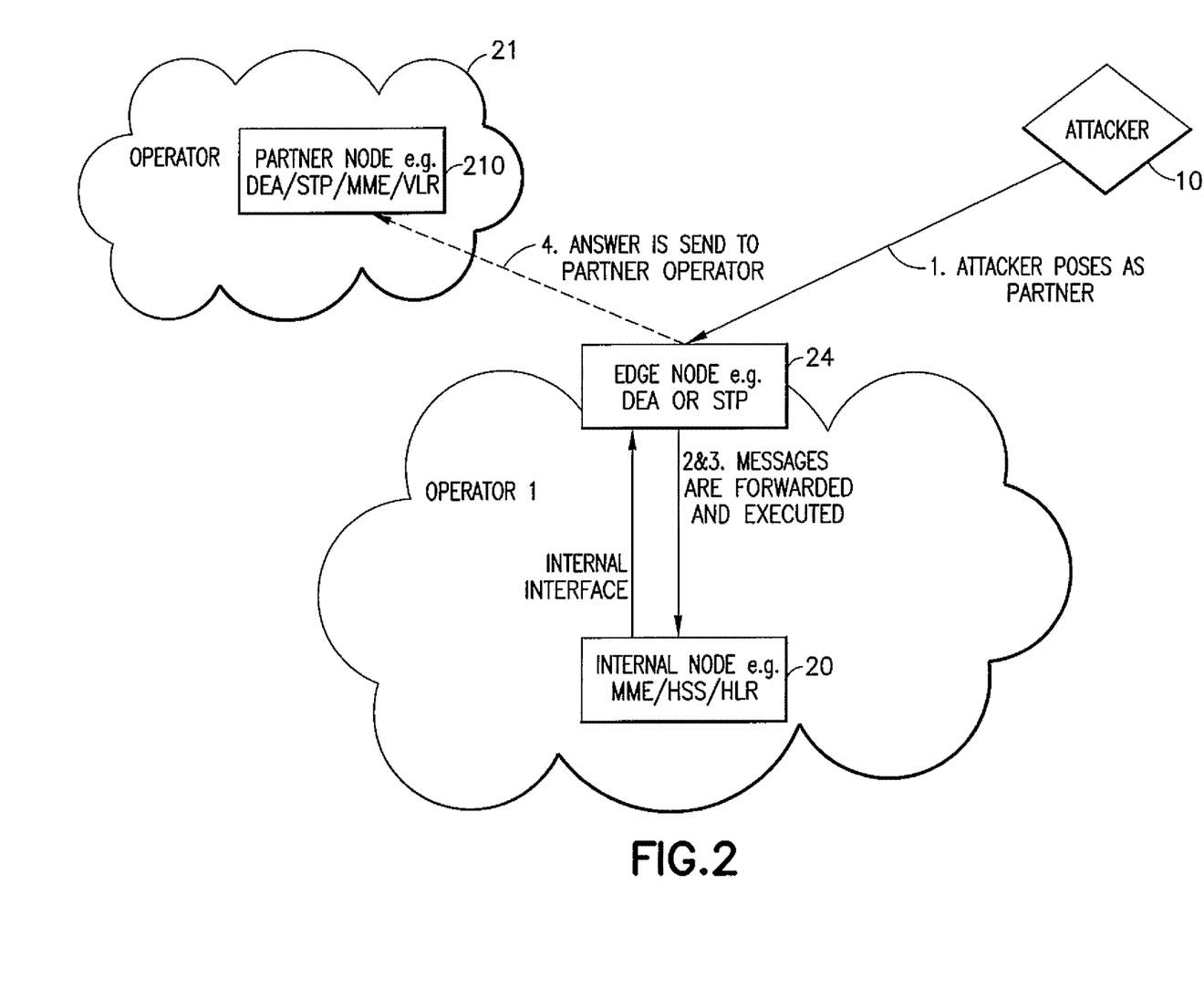
FIG. 2 shows a scenario and solution in accordance with the exemplary embodiments of the invention for a direct interconnection attack.

FIG. 2 shows a direct attack scenario which may be stopped by the operations in accordance with the example embodiments. As shown in FIG. 2 there is a Network wherein an Operator 1 is located. As shown in FIG. 2 there is an Attacker 10, an Operator 21 and an Internal Node 20. As shown in FIG. 2 the Internal Node 20 is connected to an Operator Node 21 via an Edge Node 24.

A first non-limiting direct attack scenario, in which the example embodiments can work to an advantage, includes:

1. An attacker has access to the interconnect network (roaming interconnect) and sends an attack command to the operator 1 (attacked operator, lower cloud in the figure below) that does not require an answer to work e.g. Diameter purge message (DoS against user), diameter UL (DoS against user), diameter ISD (fraud, DoS against user, eavesdropping), MAP deleteSubscriber (DoS against user), reset message (DoS network), PRN (DoS network). The attacker can spoof his sender identity by using the identity e.g. origin-realm of an partner operator 2 (for SIGTRAN that is IP address spoofing, for SS7 the Global Title). Those identities and needed information an attacker can be found via press releases on roaming agreement and IP address scan for static IP addresses, documents on IR.21 roaming that are accidentally on the internet. The identity can be: IP address, realm identity, host identity, Global Title (depending on underlying protocol) or a combination of thereof;

2. The edge node of the operator 1 (attacked operator) that receives the message is under the impression that the message is coming from a partner because the identity in the message indicates that the source of the message is a partner e.g. the origin-realm AVP used in the message is that of the partner, and the operators don't use a reliable source authentication on their interconnections (e.g. IPSec). Therefore the edge node or the attacked operator 1 forwards the message to the internal node e.g. MME, HSS, SGSN, PCRF. It is assumed that by posing as a partner the attacker can bypass realm check etc of the edge node. Edge Node 24 includes are DEA, DRA, DPA or STP, but in principle it can already be an HLR, HSS, MSC, VLR or MME (security wise it is not recommended to plug core network nodes directly to the interconnection networks, but some operators plug their core network nodes directly into the interconnection for performance reason or because of their international network set-up where they share network nodes for several networks of theirs);

3. The internal node e.g. MME, HSS or whichever was targeted responds to the request as required (e.g. deletes subscriber info) and confirms the message (ACK acknowledgement message) as required by the 3GPP specifications; and 4. The confirmation message is then going to the partner operator 2 (due to the spoofed sender identity in step 1). The partner then gets a strange message where he did not send any request for. Usually this message would be silently discarded and considered misconfiguration of partner networks. There is where this invention intends to provide a substantial change and improvement.

Operators exchange e.g. in GSMA RIFS group information on how attacks are performed and how to counter those. The above mentioned example, is a quite typical attack scenario as it allows an attacker to shift the "blame" to another operator. The other partner operator would be then suspected, but this partner then did not have any idea what was going on (of course they did not send any messages and only got "ack" messages which was discarded). By the current approach it takes quite a while to discover the fraud for the first operator. The example embodiments of the invention target and detect this kind of fraud or attack very fast without breaking the interconnect system. The detection approach introduced in this document can be added easily to the existing global system in a gradual manner and does not require large investments or infrastructure.

In accordance with an example embodiment of the invention the processing steps for a solution in accordance with the example embodiments can include the partner node at Operator 2 that receives the ack or confirmation message then performs the following steps:

1. Check if there was an outgoing message relating to that ack message (e.g. searching by correlation id, TCAP identifier, IMSI, ICC_ID, MSISDN, sending identity, and/or other identifier);
2. If no outgoing message was found, then the partner operator takes the Acknowledgement message and sends it back to the operator 1 edge node. But the following changes are applied (which allow the attacked operator to identify that he has been attacked):
   The sending identity (e.g. GT/realm) address in the upper layers (e.g., not lower layer identity, for example IP address, TCAP ID) would be the operator 1 (the attacked operator)
   The receiving identity address in the upper layer would be the operator 2 (the innocent partner operator that just got the ack message);
3. The receiving node at operator 1 (the attacked operator) would now see a message, where the IP realm and the sending identity would not match and it would look like the message was coming from themselves. So he immediately knows, that something is strange. The edge node filtering rules in a firewall or filtering software can be tuned to detect this kind of "mismatch" and raise an alarm. Today, the configuration is that those messages are discarded. If a layer matching software is deployed it would need to be extended (e.g. SS7 firewall product, DEA filtering engine) to recognize, that this "mirror message" needs to be flagged and not just discarded. This approach allows to identify already the first attack message, while the current system today requires manual interaction (e-mail, calling etc) to identify what is going on, which often gives attackers the opportunity to get away with their attack. The message that are received by operator 1 are then analysed further for at least one or more of the following:
   a. Who sends it (upper layer identity gives real sender i.e. operator 2).
   b. What message is inside (ack)
   c. What is the corresponding message that was there before (attackers messages are found) in operator 1 own edge node e.g. DEA node. And potentially the routing records or other information is retrieved, analysed and stored for potential prosecution.
   d. System discovers an ongoing attack and can stop the attack (e.g. blacklisting IMSI or blacklisting IPs deducted from routing tables).

Further, in accordance with the example embodiments of the invention there may be variants which may be applied. The possible Variants include:

1. Delay for some actions, and only release of command after a safety period is applied (and no such message as above was received);
2. Caching of data for some command and reinstall, after this kind of message above is received;
3. The receiving operator would NOT send or mirror this message back again to avoid race conditions (ping-pong of error messages); and/or
4. The message may have an additional field that confirms the integrity of the message and is signed by the partner operator or an interconnection provider (see below).

Figure 3:
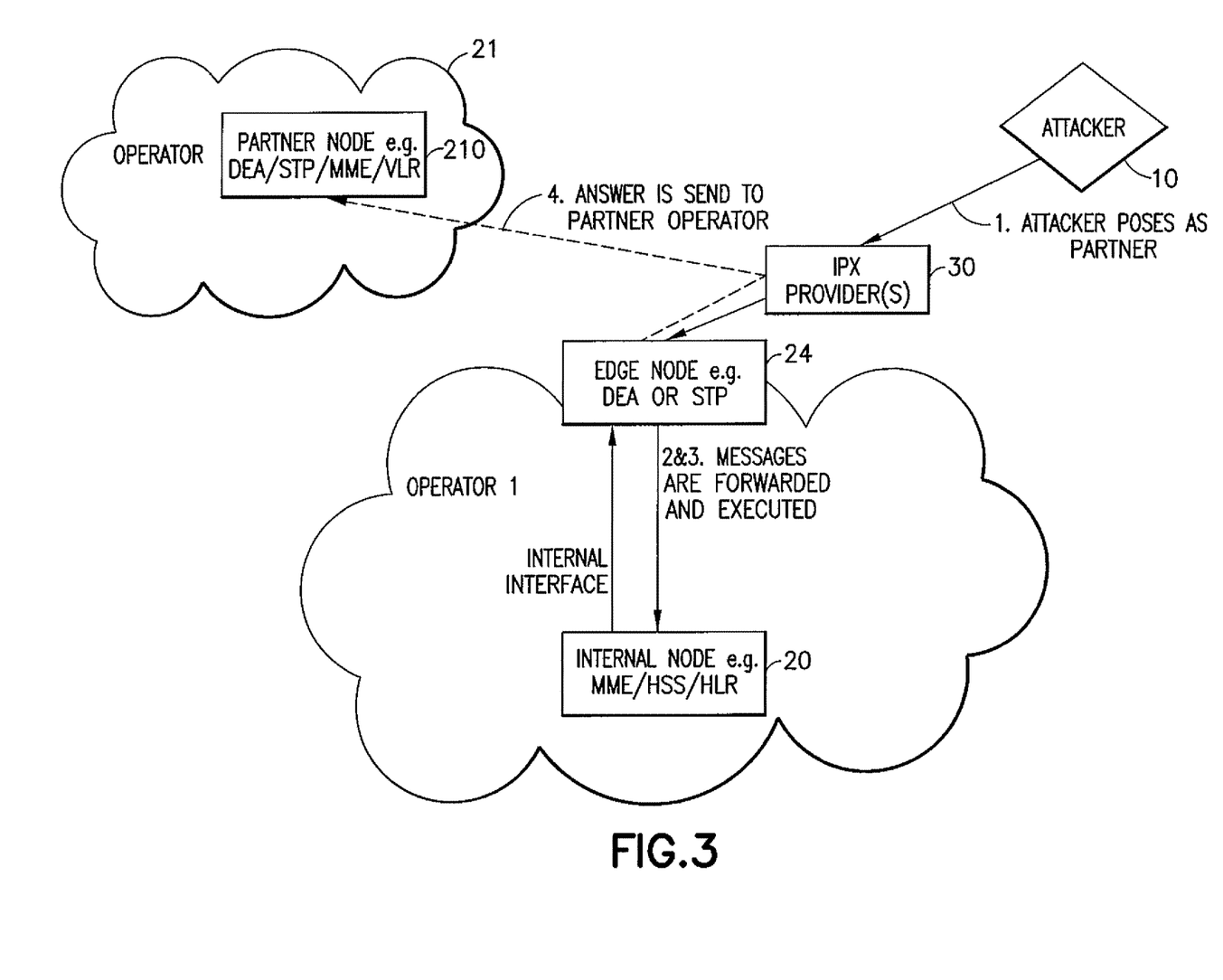
FIG. 3 shows a scenario and solution in accordance with the exemplary embodiments of the invention for indirect/transit interconnection attack.

FIG. 3 illustrates an indirect interconnection scenario and solution in accordance with the example embodiments for another attack scenario. In this scenario the incoming attack message was sent via an interconnection provider. As shown in FIG. 3 there is there is an Operator 1 network wherein the Internal Node 20 is located, and which is communicating with the Partner Node 210 of an Operator 21 network. The Internal Node 20 is connected to the Partner Node 21 via the Edge Node 24 and IPX providers 30. In addition, shown in FIG. 3 is the Attacker 10 which is connected via the IPX providers 30 (IPX 30). Even if FIG. 3 only illustrates one interconnection provider and routers (e.g. DRA), there might be several involved in the message communication.

As shown in FIG. 3 the attack steps may include:

1. The Attacker 10 poses as a partner and send messages to the operator 1 via the IPX 30;
2. & 3. The messages are forwarded to the Internal Node 20 via the Edge Node 24, where the messages would be processed in accordance with the example embodiments. It is noted that the Edge Node 24 can include any of an edge node DEA and/or STP; and the Internal Node can include an MME, HSS, and/or HLR or other core network node;
4. At this step the Internal Node 20 or the Edge Node 24 of the Operator 1 processes the messages, and an ack or confirmation to the messages is sent to the Partner Node 210. As similarly stated above the confirmation message are then going to the Partner Node 210 due to the spoofed partner identity in step 1.

In accordance with an example embodiment of the invention the processing steps for a solution in accordance with the example embodiments include that the partner node at operator 2 that receives the Ack message then performs the following steps:

1. Check if there was an outgoing message relating to that ack message (e.g. searching by correlation id, TCAP identifier, IMSI, ICC_ID, MSISDN, sending identity, and/or other identifier);
2. If no outgoing message was found, then the partner operator takes the Acknowledgement message and sends it back to the operator 1 edge node. But the following changes are applied:
   The sending identity (e.g. GT/realm) address in the upper layers (e.g., not lower layer identity, for example IP address, TCAP ID) would be the operator 1 (for the case this is replaced by the IPX, there might be several sending identities inserted and only the first will be replaced); and
   The receiving identity address in the upper layer would be the operator 2;

3. The receiving node at operator 1 would now see a message, where the IP realm and the sending identity would not match and it would look like the message was coming from themselves. Today, the configuration is that those messages are discarded. If a layer matching software is deployed it would need to be extended (e.g. SS7 firewall product, DEA filtering rule engine) to recognize, that this "mirror message" needs to be flagged and not just discarded. This message is then analysed further for at least one or more of the following:

a. Who sends it (upper layer identity gives real sender i.e. operator 2);
   b. What message is inside (ack);
   c. What is the corresponding message that was there before (attackers messages are found) in operator 1 own DEA node. And potentially the routing records or other information is retrieved, analysed and stored for potential prosecution; and
   d. System discovers an ongoing attack and can stop the attack (e.g. blacklisting IMSI or blacklisting IPs deducted from routing tables).

In addition, in accordance with the example embodiments of the invention there may be variants which may be applied to improve the system further. The possible Variants include:

Delay for some actions, and only release of command after a safety period is applied (and no such message as above was received);

Caching of data for some command and reinstall, after this kind of message above is received;

The receiving operator 1 would NOT send or mirror this message back again to avoid race conditions (ping-pong of error messages); and The message may have an additional field that confirms the integrity of the message and is signed by the partner operator The embodiments of this invention may be implemented by computer software executable by a data processor of a network device such as the Operator Node 21, the Edge Node 24, and/or the Internal Node 20 as in FIG. 2 and/or FIG. 3. The data processor such as the message processor 20G, 21G, and/or 24G as shown in FIGS. 2 and/or 3, or by hardware, or by a combination of software and hardware. It is noted that any of these devices may have multiple processors (e.g. RF, baseband, imaging, user interface) which operate in a slave relation to a master processor. The teachings may be implemented in any single one or combination of those multiple processors.

The memory 20B, 21B, and/or 24B, as in devices of FIGS. 2 and/or 3, may be of any type suitable to the local technical environment and may be implemented using any suitable data storage technology, such as semiconductor-based memory node, magnetic memory nodes and systems, optical memory devices and systems, fixed memory and removable memory. The data processors 20A, 21A, and/or 24A, as in FIGS. 2 and/or 3, may be of any type suitable to the local technical environment, and may include one or more of general purpose computers, special purpose computers, microprocessors, digital signal processors (DSFs) and processors based on a multi-core processor architecture, as non-limiting examples.

Figure 4A:
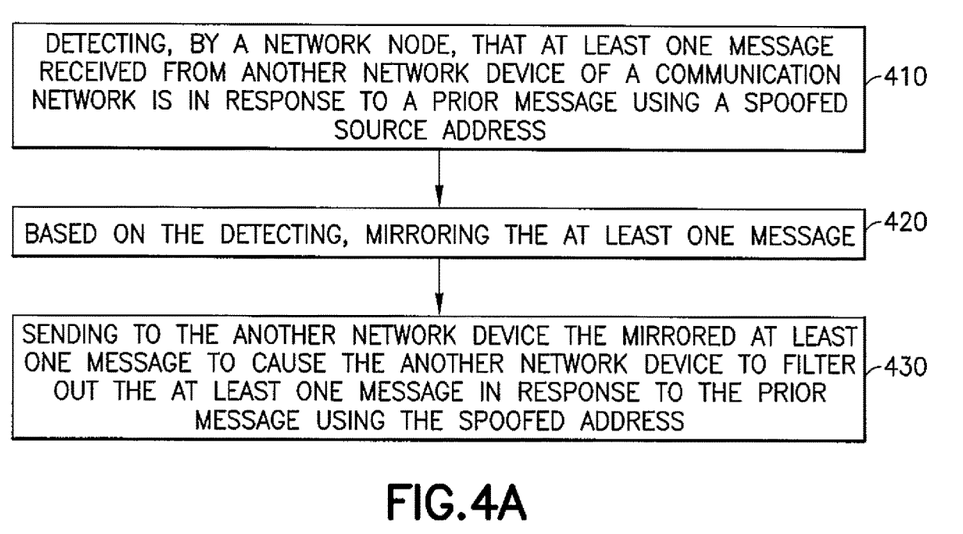
FIGS. 4a and 4b each show a method in accordance with example embodiments of the invention which may be performed by an apparatus.

FIG. 4a illustrates operations which may be performed by a network device such as, but not limited to, an Operator Node 21 and Edge Node 24 12 as in FIG. 1, e.g., an eNB. As shown in step 410 there is detecting, by a network node, that at least one message received from another network device of a communication network is in response to a prior message using a spoofed source address. As shown in step 420 of FIG. 4a there is, based on the detecting, mirroring the at least one message. Then as Shown in step 430 of FIG. 4a there is sending to the another network device the mirrored at least one message to cause the another network device to filter out the at least one message in response to the prior message using the spoofed address.

In accordance with the example embodiments as disclosed in the paragraph above, the at least one message comprises an acknowledgement message addressed to the spoofed source address.

In accordance with the example embodiments as disclosed in the paragraphs above, the spoofed address is an address of the network node.

In accordance with the example embodiments as disclosed in the paragraphs above, the detecting comprises determining that the acknowledgment message is not associated with a prior outgoing message from the network node.

In accordance with the example embodiments as disclosed in the paragraphs above, the determining comprises: being unable to locate in the acknowledgment message at least one of a correlation identification, a Transaction Capabilities Application Part identifier, International Mobile Subscriber Identity, integrated circuit card identifier, and a Mobile Station International Subscriber Directory Number that is associated with a prior outgoing message from the network node.

In accordance with the example embodiments as disclosed in the paragraphs above, the sending comprises sending to the another network device higher layer signaling indicating a sending identity and an Internet Protocol realm associated with the at least one message.

In accordance with the example embodiments as disclosed in the paragraphs above, the filtering is caused based on a mismatch of the Internet Protocol Realm and the sending identity in the higher layer signaling of the at least one message.

A non-transitory computer-readable medium (MEM 21B and/or 24B of FIG. 1) storing program code (PROG 21C and/or 24C; and MEM 21B and/or 24B of FIG. 1), the program code executed by at least one processor (Processors 21A, 21G, 24A, and/or 24G of FIG. 1) to perform the operations as at least described in the paragraphs above.

In accordance with an example embodiment of the invention as described above there is an apparatus comprising: means for detecting (Antenna 21F and/or 24F; RX 24E and/or RX 21E; PROG 21C and/or 24C; and Processors 21A, 21G, 24A, and/or 24G of FIG. 1) by a network node (Operator Node 21 and/or Edge Node 24 as in FIG. 1), that at least one message received from another network device of a communication network is in response to a prior message using a spoofed source address. Means, based on the detecting, for mirroring (RX 24E and/or RX 21E; PROG 21C and/or 24C; and Processors 21A, 21G, 24A, and/or 24G of FIG. 1) the at least one message. And means for sending (TX21D and/or TX 24D; PROG 21C and/or 24C and Processors 21A, 21G, 24A, and/or 24G of FIG. 1) to the another network device the mirrored at least one message to cause the another network device to filter out the at least one message in response to the prior message using the spoofed address of the network node.

Figure 4B:
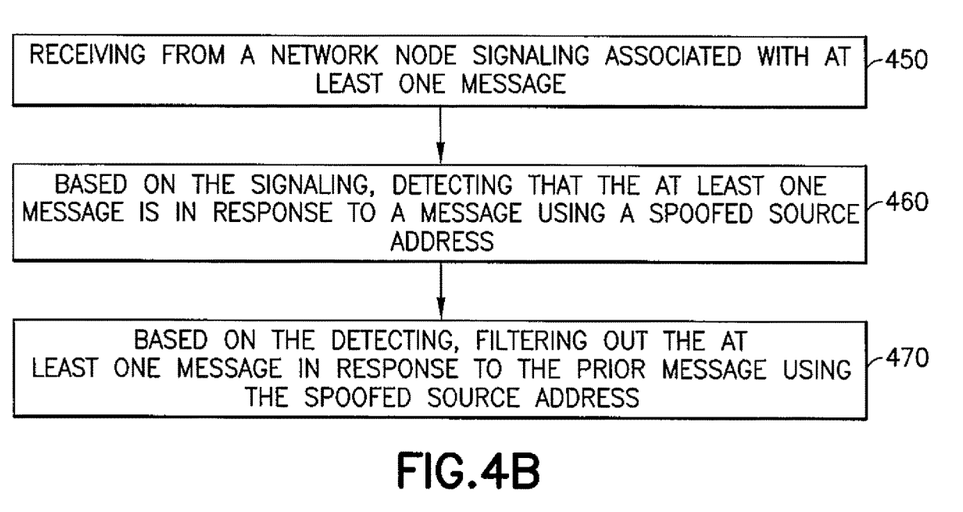

FIG. 4b illustrates operations which may be performed by a network device such as, but not limited to, an Internal Node 20 as in FIG. 1, e.g., a user equipment (UE). As shown in step 450 there is receiving from a network node signaling associated with at least one message. As shown in step 460 of FIG. 4b there is based on the signaling, detecting that the at least one message is in response to a prior message using a spoofed source address. Then as shown in step 470 of FIG. 4b there is, based on the detecting, filtering out the at least one message in response to the prior message using the spoofed source address.

In accordance with the example embodiments as disclosed in the paragraph above, the detecting the at least one message is using a spoofed source address comprises determining there is a mismatch of an Internet Protocol Realm and a sending identity indicated in higher layer signaling of the received signaling.

In accordance with the example embodiments as disclosed in the paragraphs above, the detecting comprises determining that the spoofed source address is an address of the network node.

In accordance with the example embodiments as disclosed in the paragraphs above, the at least one message comprises an acknowledgement message addressed to the spoofed source address.

In accordance with the example embodiments as disclosed in the paragraphs above, the detecting comprises identifying that the acknowledgment message is not associated with a prior outgoing message from the network node.

In accordance with the example embodiments as disclosed in the paragraphs above, the identifying comprises: being unable to locate in the acknowledgment message at least one of a correlation identification, a Transaction Capabilities Application Part identifier, International Mobile Subscriber Identity, integrated circuit card identifier, and a Mobile Station International Subscriber Directory Number associated with a prior outgoing message from the network node.

A non-transitory computer-readable medium (MEM 2 of FIG. 1) storing program code (PROG 20C and MEM 20B of FIG. 1), the program code executed by at least one processor (Processors 20A and/or 20G of FIG. 1) to perform the operations as at least described in the paragraphs above.

In accordance with an example embodiment of the invention as described above there is an apparatus comprising: means for receiving (Antenna 20F; RX 20E; PROG 20C; MEM 20B; and Processors 20A and/or 20G of FIG. 1) by a network device (e.g., Internal Node 20 as in FIG. 1) of a communication network, from a network node signaling associated with at least one message. Means, based on the signaling, for detecting (Antenna 20F; RX 20E; PROG 20C; MEM 20B; and Processors 20A and/or 20G of FIG. 1) that the at least one message is in response to a prior message using a spoofed source address. And means, based on the detecting, for filtering (RX 20E; PROG 20C; MEM 20B; and Processors 20A and/or 20G of FIG. 1) out the at least one message in response to the prior message using the spoofed source address.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, steps, or using some other pictorial representation, it is well understood that these steps, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof to allow the conveyance of messages towards each other. As employed herein two elements may be considered to be "connected" or "coupled" together by the use of one or more wires, cables and/or printed electrical connections, as well as by the use of satellite connection, undersea cables, electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    detecting, by a network node, that at least one message comprising an acknowledgement message received from another network device of a communication network is in response to a message to the another network device from an attacker using a spoofed source address of the network node,
    wherein the detecting comprises determining that the at least one message is not associated with an outstanding outgoing message from the network node;
    in response to the detecting, generating a mirrored copy of the at least one message such that a sending identity of the mirrored copy of the message comprises a source address of the another network device; and
    sending to the another network device the mirrored copy of the at least one message with an indication of at least the sending identity comprising the source address of the another network device and an Internet Protocol realm identity associated with the network node to cause triggering the another network device to prevent any acknowledgement message in response to the at least one message using the spoofed source address of the network node, wherein the triggering is at least based on a mismatch of the Internet Protocol Realm identity associated with the network node and the source address of another network device in the mirrored copy of the at least one message.

2. The method of claim 1, wherein the communication network comprises at least one of a GRX/IPX or SS7 operator network.

3. The method of claim 2, wherein the acknowledgement message is addressed to the spoofed source address, and wherein the spoofed source address is an address of the network node.

4. The method of claim 1, wherein the determining comprises:
being unable to locate in the acknowledgement message at least one of a correlation identification, a Transaction Capabilities Application Part identifier, International Mobile Subscriber Identity, integrated circuit card identifier, and a Mobile Station International Subscriber Directory Number that is associated with the outgoing message from the network node.

5. The method of claim 1, wherein the indication of the at least a sending identity and the Internet Protocol realm identity associated with the at least one message is sent to the another network device in signaling of the at least one message.

6. A non-transitory computer-readable medium storing program code, the program code executed by at least one processor to perform:
detecting, by a network node, that at least one message comprising an acknowledgement message received from another network device of a communication network is in response to a message to the another network device from an attacker using a spoofed source address of the network node,
wherein the detecting comprises determining that the at least one message is not associated with an outstanding outgoing message from the network node;
in response to the detecting, generating a mirrored copy of the at least one message such that a sending identity of the mirrored copy of the at least one message comprises a source address of the another network device; and
sending to the another network device the mirrored copy of the at least one message indicating at least the sending identity comprising the source address of the another network device and an Internet Protocol realm identify associated with the network node to cause triggering the another network device to prevent any acknowledgement message in response to the at least one message using the spoofed source address of the network node, wherein the filtering is caused triggering is at least based on a mismatch of the Internet Protocol Realm identity associated with the network node and the source address of the another network device in the mirrored copy of the at least one message.

7. An apparatus comprising:
at least one processor; and
at least one memory including computer program code, where the at least one memory and the computer program code are configured, with the at least one processor, to cause the apparatus to at least:
detect, by a network node, that at least one message comprising an acknowledgement message received from another network device of a communication network is in response to a message to the another network device from an attacker using a spoofed source address of the network node,
wherein the detecting comprises determining that the at least one message is not associated with an outstanding outgoing message from the network node;
in response to the detecting, generate a mirrored copy of the at least one message such that a sending identity of the mirrored copy of the at least one message comprises a source address of the another network device; and
send to the another network device the mirrored copy of the at least one message with an indication of at least the sending identity comprising the source address of the another network device and an Internet Protocol realm identity associated with the network node to cause triggering the another network device to to prevent any acknowledgement message in response to at least one message using the spoofed source address of the network node, wherein the triggering is at least based on a mismatch of the Internet Protocol Realm identity associated with the network node and the and the source address of the another network device in the mirrored copy of the at least one message.

8. The apparatus of claim 7, wherein the acknowledgement message is addressed to the spoofed source address.

9. The apparatus of claim 8, wherein the spoofed source address is an address of the apparatus.

10. The apparatus of claim 9, wherein the determining comprises:
being unable to locate in the acknowledgement message at least one of a correlation identification, a Transaction Capabilities Application Part identifier, International Mobile Subscriber Identity, integrated circuit Card identifier, and a Mobile Station International Subscriber Directory Number that is associated with the outgoing message from the apparatus.

11. The apparatus of claim 7, wherein the indication of the at least a sending identity and the Internet Protocol realm identity associated with the at least one message is sent to the another network device in signaling of the at least one message.

12. The non-transitory computer-readable medium storing program code of claim 6, wherein the communication network comprises at least one of a GRX/IPX or SS7 operator network.

13. The non-transitory computer-readable medium storing program code of claim 12, wherein the acknowledgement message is addressed to the spoofed source address, and wherein the spoofed source address is an address of the network node.

14. The non-transitory computer-readable medium storing program code of claim 6, wherein the determining comprises:
being unable to locate in the acknowledgement message at least one of a correlation identification, a Transaction Capabilities Application Part identifier, International Mobile Subscriber Identity, integrated circuit card identifier, and a Mobile Station International Subscriber Directory Number that is associated with the outgoing message from the network node.

15. The non-transitory computer-readable medium storing program code of claim 6, wherein the indication of the at least a sending identity and the Internet Protocol realm identity associated with the at least one message is sent to the another network device in signaling of the at least one message.

* * * * *

UNITED STATES PATENT AND TRADEMARK OFFICE
CERTIFICATE OF CORRECTION

PATENT NO. : 10,893,069 B2  
APPLICATION NO. : 15/441363  
DATED : January 12, 2021  
INVENTOR(S) : Martin K. Peylo and Silke Holtmanns

Page 1 of 1

It is certified that error appears in the above-identified patent and that said Letters Patent is hereby corrected as shown below:

In the Claims

In Claim 6  
Column 13, Line 46, "filtering is caused" should be deleted.

Signed and Sealed this  
Second Day of March, 2021

Drew Hirshfeld  
*Performing the Functions and Duties of the*  
*Under Secretary of Commerce for Intellectual Property and*  
*Director of the United States Patent and Trademark Office*